United States Patent [19]

Molinari

[11] 4,042,202
[45] Aug. 16, 1977

[54] JACK STAND WITH SAFETY LOCKING DEVICE

[76] Inventor: Delmo C. Molinari, 10820 Ambazac Way, Los Angeles, Calif. 90024

[21] Appl. No.: 686,169

[22] Filed: May 13, 1976

[51] Int. Cl.² ............................................. E04G 25/00
[52] U.S. Cl. ................................. 248/352; 248/354 P; 403/379
[58] Field of Search ................... 248/161, 407, 188.5, 248/351, 352, 354 R, 354 P; 403/108, 109, 318, 319, 324, 378, 379, 408

[56] References Cited

U.S. PATENT DOCUMENTS

| | | | |
|---|---|---|---|
| 251,464 | 12/1881 | Rogers | 403/408 X |
| 777,113 | 12/1904 | Lester | 403/324 |
| 849,604 | 4/1907 | Fortiner | 403/408 |
| 939,019 | 11/1909 | Hartwell | 403/379 X |
| 2,439,854 | 4/1948 | Lipski | 248/354 P X |

FOREIGN PATENT DOCUMENTS

| | | | |
|---|---|---|---|
| 165,332 | 2/1950 | Austria | 403/408 |

*Primary Examiner*—Lawrence J. Staab
*Attorney, Agent, or Firm*—Blakely, Sokoloff, Taylor & Zafman

[57] ABSTRACT

A jack stand with a safety locking device whereby the pin for locking the extensible member with respect to the base or housing is keyed so as to prevent withdrawal of the pin until rotated into an aligned position. The through hole in the base for receiving the locking pin is slotted so as to receive a pin having projections for fitting through the slots, with the projections on the pin preventing withdrawal when the pin is not in the aligned position.

5 Claims, 6 Drawing Figures

U.S. Patent  Aug. 16, 1977  4,042,202
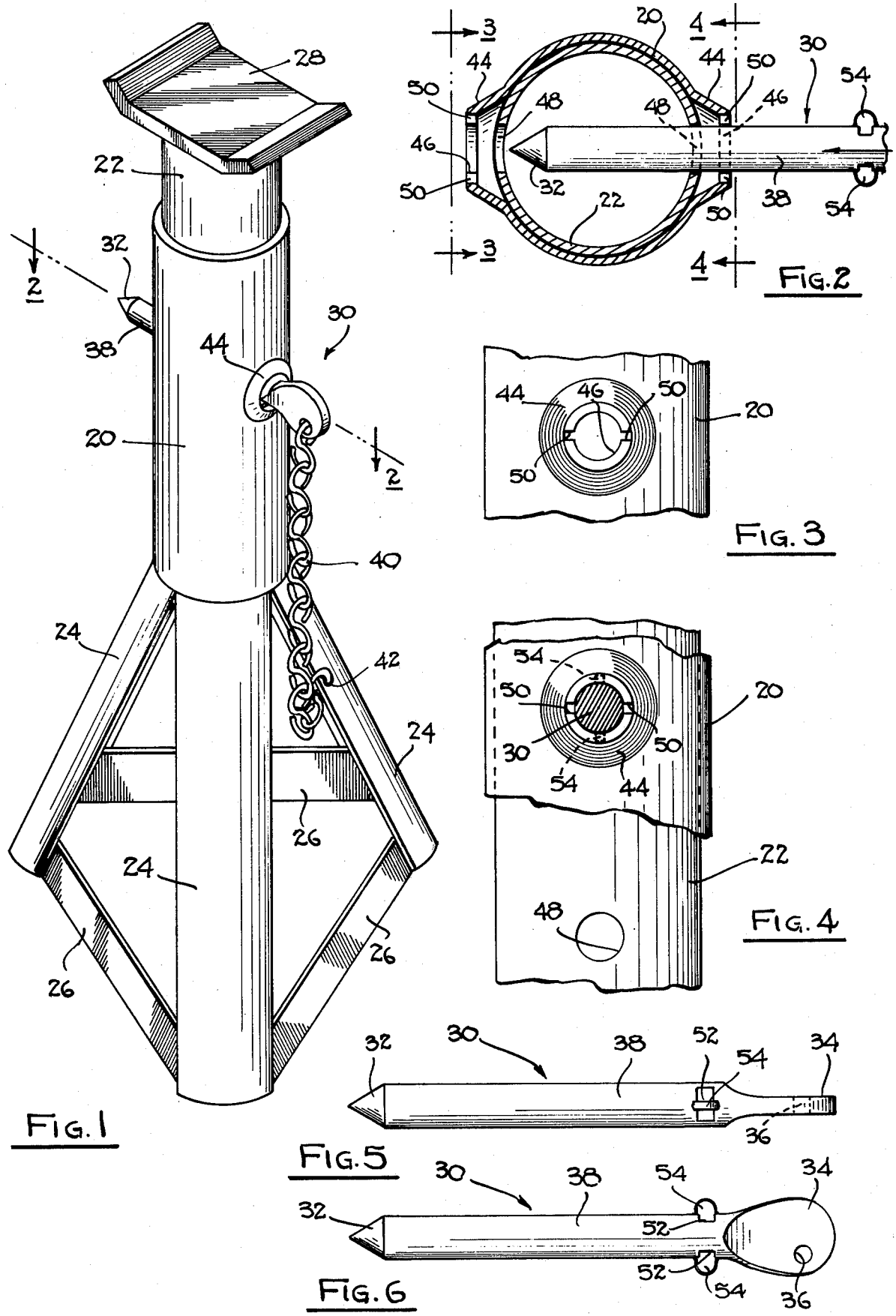

JACK STAND WITH SAFETY LOCKING DEVICE

BACKGROUND OF THE INVENTION

1. Field of the Invention

The present invention relates to the field of jack stands.

2. Prior Art

Jack stands for the temporary support of an automobile are well known in the prior art. Such stands are normally used in conjunction with jacking devices, such as bumper jacks and axle jacks, for supporting a vehicle or at least a portion thereof with one or more wheels off of the ground.

In their simplest application the axle or frame of a vehicle is raised by some form of conventional jack, and a jack stand is adjusted to the appropriate height and placed under the frame or axle so as to retain the vehicle at the desired height and to allow the removal of the jack for other use. Thus in this application the primary function of the jack stand is to support the vehicle at the desired height, so that the features of adjustability and positive locking of the stand at the selected height are primary considerations.

Whenever jack stands are used to support a vehicle so that two or more wheels are off the ground, typically the two front wheels or the two rear wheels, the further requirements of strength and rigidity of the jack stand also become very important. In particular, with the two front wheels or the two rear wheels supported off the ground, the directional stability normally present with three wheels on the ground is lost, even with the remaining two wheels locked, so that the stability of the support depends to a large extent upon the stability of the jack stand, which in turn depends upon the combination of the base size and strength and rigidity of the base support assembly. In particular, a narrow base or small "footprint" of a jack stand will decrease its stability, presenting a safety hazard when supporting a vehicle. In fact jack stands have come into widespread use in recent years not only because they are less expensive than ordinary jacks and free jacks for other use, but also because they have much larger base areas than conventional jacks, grossly reducing the likelihood of the tipping and loss of support. Jack stands also have the advantage of being relatively solid and positive in their vertical support, unlike conventional jacks which may slip or may be inadvertently released, to the great hazard to those depending upon the support.

Also in recent years jack stands have found their way into the consumer market and are now widely distributed for consumer use, being sold in auto parts stores, hardware stores and the like, for supporting vehicles, boat trailers, camping trailers, etc. For this market, cost is a primary consideration, requiring that the foregoing objects be achieved with a simple assembly of a minimum number of parts.

In general, prior art jack stands utilize a simple straight shank pin for vertical height adjustment, and thus do not have any means for locking the pin in position.

One prior art jack stand having a locking device is disclosed in U.S. Pat. No. 2,439,854. The device of that patent utilizes a conventional jack stand having circular through holes in the tubular members, with a pin having three right angle bends providing engagement with the stand when in a lower position to resist withdrawal. Other locking devices are also shown in U.S. Pat. Nos. 872,335 and 2,685,353.

BRIEF SUMMARY OF THE INVENTION

A jack stand with a safety locking device whereby the pin for locking the extensible member with respect to the base or housing is keyed so as to prevent withdrawal of the pin until rotated into an aligned position. The embodiment disclosed uses a first tubular member split at the bottom thereof to provide a triangular stand, and having a through hole adjacent to the upper portion thereof for receiving the locking pin. The region of the tubular member surrounding the through hole is formed outward, with the through hole further having a slot through which protruding sections on the pin may pass. A second tubular member slides within the first tubular member, and has a plurality of through holes so that the pin may lock the two tubular members together at a selected elevation. The pin contains a swaged region forming protrusions which will fit through the slot when aligned therewith, and which may rotate in the regions between the first and second tubular members so as to lock the pin in position by the misalignment of the pin protrusions and the slot in the first tubular member.

BRIEF DESCRIPTION OF THE DRAWINGS

FIG. 1 is a perspective view of the preferred embodiment of the present invention;

FIG. 2 is a partial cross-section taken along the plane of line 2—2 of FIG. 1 showing insertion of the locking pin;

FIG. 3 is a view taken along line 3—3 of FIG. 2;

FIG. 4 is a view taken along line 4—4 of FIG. 2 with pin 30 inserted and rotated to the locked position;

FIGS. 5 and 6 are views of the locking pin.

DETAILED DESCRIPTION OF THE INVENTION

The jack stand of the present invention comprises a simple assembly of a limited number of parts, and features an adjustment pin which is locked in position by rotation of the pin to prevent inadvertent slippage or withdrawal thereof. In the preferred embodiment this is achieved by the keying of the pin so that it may be inserted only when in specific orientations, and so that it will become locked in position by the rotation thereof to prevent direct withdrawal of the pin.

Now referring to FIG. 1, a perspective view of the preferred embodiment of the present invention may be seen. This assembly is comprised primarily of two major parts, specifically a first tubular member 20 and a second tubular member 22. Tubular member 20, fabricated from steel tubing, is provided with three equally spaced slits at the bottom thereof to provide three support legs 24 bent outward from the tubular shape so as to provide a triangular base or footprint for the jack stand. The legs 20, each being curved in cross-section and representing nearly 120° of the circular section of the first tubular member 20, are both rigid and strong, needing no further support for the required vertical load capacity. Three steel straps 26 are riveted or attached between the base of the legs 24 in a triangular pattern so as to rigidify the legs at the base thereof to positively define the desired spread of the legs 24 at the base of the device.

Sliding within the first tubular member 20 is a second tubular member 22 having a conventional support pad 28 welded to the top thereof for supporting a portion of a vehicle such as an axle (differential housing, etc.), or frame member. As shall subsequently be seen, the second tubular member 22 has a plurality of horizontally disposed through holes, each at one of a plurality of elevations and generally alignable with a through hole in the first tubular member 20 so that a pin, generally indicated by the numeral 30, may be used to retain the two tubular members at any of a plurality of elevations for the pad 28.

Now referring to FIGS. 5 and 6, details of the pin 30 of the embodiment of FIG. 1 may be seen. Pin 30 is a generally cylindrical member fabricated from steel rod, preferably with one end 32 being tapered for ease of insertion and alignment of the holes in the first and second tubular members. The opposite end 34 of the pin is preferably flattened as shown. This flattened region provides a convenient thumb grip for the pin for insertion and removal, and because it effectively increases the diameter of the pin at that point prevents over insertion of the pin. Also as may be seen in FIG. 6, a through hole 36 is provided through the flattened region 34, and more particularly, adjacent one edge thereof spaced away from the axis of the center cylindrical region 38. This through hole 36, as may be seen in FIG. 1, is coupled to chain 40, which in turn is coupled through a hole 42 in one of legs 24 of the first tubular member. The fastening of the chain off center on pin 30 makes the pin pendulous, thereby tending to cause rotation of the pin to the orientation shown in FIG. 1.

It will be noted from FIG. 1 that the region 44 surrounding the hole in the first tubular member 20 is expanded or formed outward from the otherwise generally circular cross-section of the tubular member. In fact, as may be seen in FIG. 2 which is a partial cross-section taken along line 2—2 of FIG. 1, the first tubular member 20 is expanded at both locations of the through hole 46 in the tubular member 20, whereas in the preferred embodiment the second tubular member 22 is generally circular in cross-section, except for the plurality of holes 48 therethrough. With this configuration a space is provided between holes 46 in tubular member 20 and the holes 48 in the tubular member 22. This space, as will be subsequently seen, provides a region for locking the pin with respect to tubular member 20.

Now referring to FIG. 3 a side view of a portion of tubular member 20, and more particularly region 44 and the through hole 46, may be seen. In particular, it will be noted that the hole 46 in the preferred embodiment is characterized by the generally circular portions interrupted by slots 50, effectively defining keyways for receiving protruding regions on the pin 30. In that regard it will be noted in FIGS. 5 and 6 that pin 30 has a pair of swaged regions 52 which create small diametrically opposed protrusions 54 forming key-like regions in the pin 30 to slide through slots or keyways 50 in the opening 46 in tubular member 20. The width or axial extent of the protruding regions 54 is purposely kept small, and more particularly, smaller than the separation between the first and second tubular members in the region of holes 46 so that the pin 30 may be inserted therethrough and rotated 90° to the position shown in FIG. 1 to prevent direct axial withdrawal of the pin. This is illustrated in FIG. 4, wherein pin 30 is shown in cross-section, with the protrusions 54 shown in phantom between the adjacent walls of the first and second tubular members. As previously mentioned, the combination of the retaining chain 40 and its connection through offset hole 36 in the pin 30 makes the pin pendulous, tending to naturally cause the pin to remain in the position illustrated in FIG. 1 so as to prevent slippage or inadvertent withdrawal of the pin.

It will be noted from the embodiment hereinbefore described in detail that the overall assembly of the preferred embodiment is particularly durable and simple. In this embodiment the stand or base portion is formed from flat stock, stock, curled and welded. The three legs are positioned and secured with steel straps to provide a strong, rigid and integral stand assembly. The extensible portion is fabricated from a tubular section 22 having a small plate 28 welded to the top thereof, with adjustment being provided by pin 30 formed of steel rod simply flattened, tapered and swaged to provide a simple yet durable locking pin. Obviously while the embodiment hereinbefore described utilizes diametrically opposed swaged regions on the pin 30 and cooperatively disposed slots 50 in the through hole of member 20, a single or unitary slot and swaged region might also be used. Further, clearance for the rotation of the swaged region may be provided, as an alternative, by the inward depression of the second tubular member 22 in the region of holes 48 or by the combination of local deformation of both tubular members. Similarly while desirable, it is not necessary that pin 30 be insertable from both directions, as the proper direction for insertion would be immediately obvious to the user. Thus while the preferred embodiment has been disclosed and described in detail herein, it will be obvious to those skilled in the art that various changes in form and detail may be made therein without departing from the spirit and scope of the invention.

I claim:

1. A jack stand comprising:

a first generally upright tubular member, said first tubular member having means for defining a base for resting on a horizontal surface, and having first and second holes through opposite sides of said first tubular member adjacent the upper end thereof for receiving a pin, the region of said first tubular member surrounding said first and second holes being formed outward from the inner surface of said first tubular member, each of said first and second holes having a cross-section having a circular portion and a slot like portion;

a second generally upright tubular member coaxial with and slideable within said first tubular member, said second tubular member having means adjacent the upper end thereof for engaging and supporting a part of an automobile, said second tubular member further having a plurality of horizontally disposed through holes, each at one of a plurality of elevations and each generally alignable with said first and second holes in said first tubular member; and a pin for extending through said horizontally disposed hole in said first tubular member and any of said horizontally disposed holes in said second tubular member to retain said first and second tubular members in a selected relative axial disposition, said pin having at least one protruding region adjacent one end thereof for fitting through said slot like portion of said first and second holes in said first tubular member.

2. The jack stand of claim 1 wherein said pin is a substantially cylindrical pin swaged to provide a pair of diametrically opposed protruding regions.

3. The jack stand of claim 2 wherein one end of said pin is tapered and the other end is flattened, and wherein said pin is coupled to said first tubular member by a length of chain.

4. A jack stand comprising:
 a generally upright tubular member, said first tubular member having means for defining a base for resting on a horizontal surface, and having a horizontally disposed through hole adjacent the upper end thereof;
 a second generally upright tubular member coaxial with and slideable within said first tubular member, said second tubular member having adjacent the upper end thereof means for engaging and supporting a part of an automobile, said second tubular member further having a plurality of horizontally disposed through holes, each at one of a plurality of elevations and each generally alignable with said through hole in said first tubular member;
 a pin for extending through said horizontally disposed hole in said first tubular member and any of said horizontally disposed holes in said second tubular member to retain said first and second tubular members in a selected relative axial disposition; and
 at least one region of said pin and said horizontally disposed hole in said first tubular member having cooperatively disposed sections deviating from a circular section, wherein a portion of the region surrounding said horizontally disposed hole in said first tubular member is spaced apart from said second tubular member, whereby said pin may be inserted and the non-circular region of said pin may be rotated therebetween so as to resist direct axial withdrawal thereof.

5. A jack stand comprising:
 a first generally upright tubular member, said first tubular member having means for defining a base for resting on a horizontal surface, and having first and second horizontally disposed through holes adjacent the upper end thereof and through opposite sides of said first tubular member;
 a second generally upright tubular member coaxial with and slideable within said first tubular member, said second tubular member having adjacent the upper end thereof means for engaging and supporting a part of an automobile, said second tubular member further having a plurality of horizontally disposed through holes, each at one of a plurality of elevations and each generally alignable with said through hole in said first tubular member;
 a pin for extending through said horizontally disposed hole in said first tubular member and any of said horizontally disposed holes in said second tubular member to retain said first and second tubular members in a selected relative axial disposition; and
 at least one region of said pin and each of said first and second horizontally disposed holes in said first tubular member having cooperatively disposed sections deviating from a circular section, the regions of said first tubular member adjacent said first and second holes being separated from the outer surface of said second tubular member, whereby said pin may be inserted into either of said first and second holes and rotated so as to be retained by a section of said pin between said first and second tubular members.

* * * * *